Feb. 28, 1961     E. P. BULLARD III     2,972,905
VARIABLE SPEED TRANSMISSION
Filed Aug. 30, 1957     2 Sheets-Sheet 1
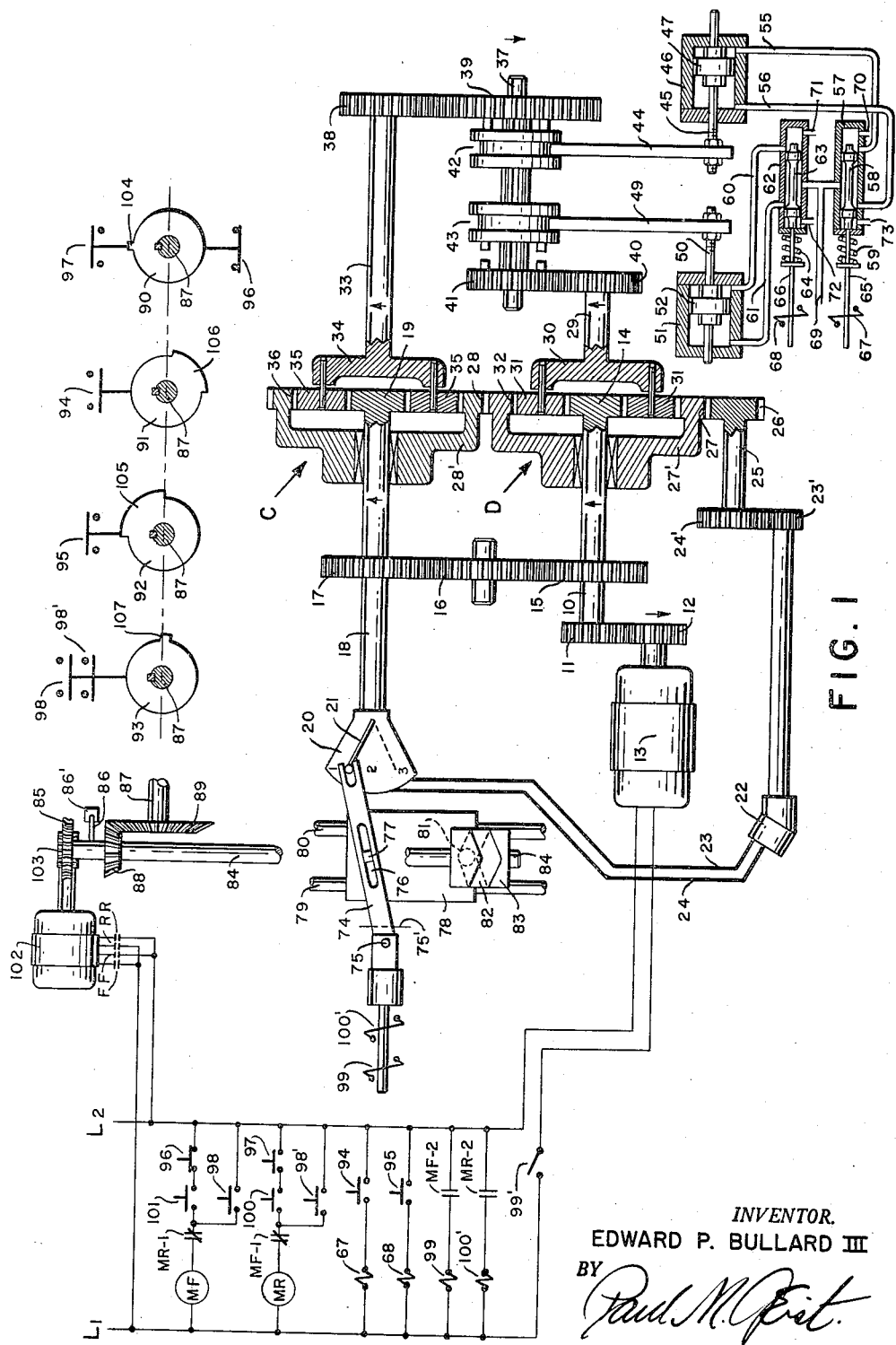
FIG. I
INVENTOR.
EDWARD P. BULLARD III
BY
ATTORNEY

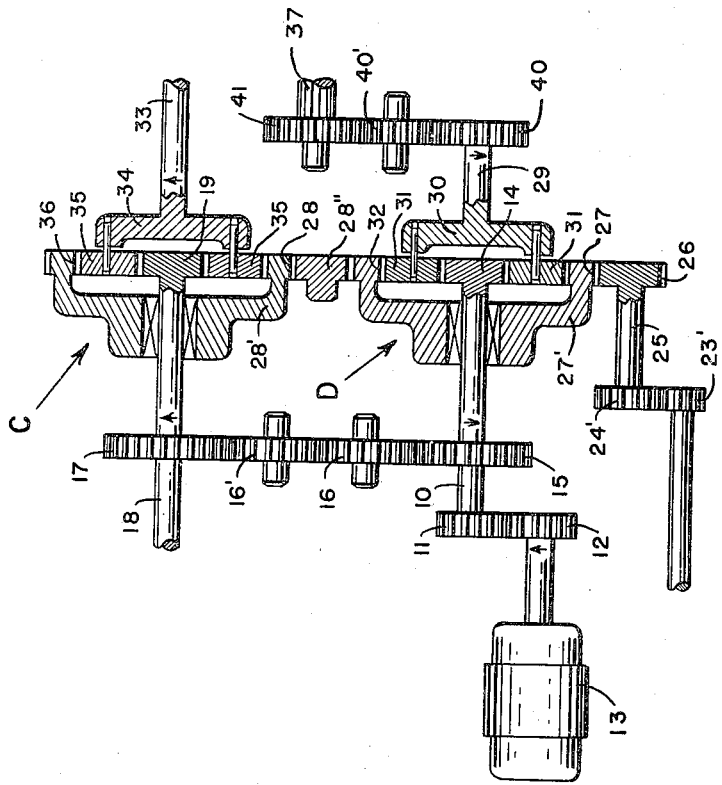

United States Patent Office 2,972,905
Patented Feb. 28, 1961

2,972,905

VARIABLE SPEED TRANSMISSION

Edward P. Bullard III, Stoney Creek, Conn.
(Cherry Lane, Fairfield, Conn.)

Filed Aug. 30, 1957, Ser. No. 681,239

34 Claims. (Cl. 74—681)

The present invention relates to variable speed transmissions, and particularly to a new and improved variable speed transmission capable of producing constant horsepower output throughout a predetermined range of speeds, and a control therefor.

An object of this invention is to provide a variable speed transmission in which separate and independently effective paths of power flow are employed, but arranged so that during the effectiveness of one, the other is conditioned preparatory to becoming effective.

Another object of this invention is to provide such a transmission in which epicyclic gearing arrangements are provided in plural paths of power flow.

Another object of this invention is to provide such a transmission in which the effectiveness of one path of power flow and the conditioning of another is caused by an element of one of the epicyclic gearing arrangements increasing in speed while an element of the other decreases in speed.

Another object of this invention is to provide such a transmission in which the epicyclic gearing arrangements are acted upon by an auxiliary variable speed device and in which ratio means is provided between the epicyclic gearing arrangements and the output shaft for causing the output shaft to rotate at the same speed through either epicyclic gearing arrangement at a point within the range of speed adjustment of the auxiliary variable speed device.

Another object of the invention is to provide such a transmission in which dissimilar ratio means is provided between the epicyclic gearing arrangements and the output shaft to cause the output shaft to rotate at the same speed when the elements of the epicyclic gearing arrangements that increase and decrease in speed are respectively, at a speed above and below the base speed of their respective arrangements.

Another object of this invention is to provide a control for such a variable speed transmission in which the transfer of power from one of the epicyclic gearing arrangements to the other is occasioned under "no-load" conditions.

Another object of this invention is to provide a control for such a transmission in which power transfer from one epicyclic gearing arrangement to the other is effected when a pre-determined condition of synchronization occurs within the transmission.

One aspect of the invention may be to provide two paths of power flow between an input and an output shaft. An epicyclic gearing arrangement may be located in each of said paths, and each arrangement may have the usual three power transmitting elements. One of the elements of each arrangement may be driven from the input shaft, and a second element of each arrangement may be driven by an adjustable auxiliary variable speed device. The auxiliary variable speed device may be of any type so long as it is capable of being adjusted in two directions within its range of speed variations. It may or may not be reversible, it may or may not be a stepless type of variable speed device, it may or may not be of a hydraulic type of steplesly variable speed device, and it may be driven by the input shaft or by any external source of power. However, under certain conditions, if the auxiliary variable speed device is driven by an external source of power, a loss of feed-back power may be experienced during a portion of the range of operation of the transmission, which otherwise could be employed to advantage.

In another aspect of the invention, the auxiliary variable speed device may be connected to the epicyclic gearing arrangements in such a manner to cause a third element of one arrangement to increase in speed and a third element of the other arrangement to decrease in speed as the auxiliary variable speed device is operated in either of its directions of speed adjustment.

Ratio means may be provided between the output shaft and the third elements of the epicyclic arrangements which increase and decrease in speed as the auxiliary variable speed device is adjusted. In the embodiment disclosed, dissimilar ratio means are employed, and they may be such as to cause the output shaft to rotate at the same speed when one of the above-referred-to third elements is rotating at a speed above the base speed of its arrangement, and the other is rotating at a speed below the base speed of its arrangement.

Another aspect of the invention may be to provide means for transferring the flow of power to the output shaft from one of the third elements to the other third element when said third elements are, respectively, rotating above and below the base speed of their corresponding epicyclic arrangements, or when the auxiliary variable speed device is at one limit of its speed adjustment.

In another aspect of the invention, a control may be employed to operate the variable speed transmission, and it may include means for rendering effective both epicyclic gearing arrangements in a manner to cause one to unload the other prior to rendering the other ineffective. This may be accomplished by employing an adjustable operating lever for varying the speed of the variable speed device that is connected to the epicyclic gearing arrangements. By shortening the effective length of this lever during periods when the output speed of the transmission is increasing, and lengthening the effective length during periods when the output speed is decreasing, makes it possible to ensure positive clutch engagement with one of the arrangements and the unloading of the other arrangement prior to the latter being rendered ineffective.

In a transmission constructed in the above-referred-to manner, a range of speeds can be produced with one of the epicyclic gearing arrangements being effective independently of the other arrangement and while adjusting the auxiliary variable speed device through one direction of its speed adjustment. And, another range of speeds can be produced with the other epicyclic gearing arrangement effective independently of the first-mentioned arrangement and while adjusting the auxiliary variable speed device through the other direction of its speed adjustment.

The above as well as other objects and novel features of the invention will become apparent from the following specification and accompanying drawing, which is merely exemplary.

In the drawing:

Figure 1 is a schematic diagram of a variable speed transmission and control therefor to which the principles of the invention have been applied; and Figure 2 is a schematic diagram of a modified form of certain of the elements shown in Fig. 1.

Referring to the drawings, and particularly to Fig. 1, an input shaft 10 may be connected by suitable means such as gears 11 and 12 to a prime mover such, for example, as a constant speed A.C. motor 13. The input shaft 10 may be connected to a first element of an epicyclic gearing arrangement D located in one path of power flow. In the embodiment disclosed, the shaft 10 is shown as connected to a sun gear 14, although it is evident that any one of the three power transmitting elements of the epicyclic gearing arrangement D could have been selected.

Spur gearing including gears 15, 16 and 17 are shown as driving a shaft 18 from shaft 10 in the same direction as shaft 10, although the direction of rotation of shaft 10 relative to shaft 18 is immaterial as will be explained hereinafter. The shaft 18 is connected to a first element of another epicyclic gearing arrangement C located in another path of power flow. While the shaft 18 may be connected to any one of the three power transmitting elements of the arrangement C, it is shown as being connected to a sun gear 19 thereof.

The shaft 18 is also connected to a positive displacement variable volume hydraulic unit 20, the variable displacement of which can be changed by the movement of a lever 21 between two limiting positions at which the unit 20 delivers liquid under pressure at maximum capacity in opposite directions of flow. When the lever 21 is at its midpoint of movement, no fluid is delivered by the unit 20.

The unit 20 may be of any positive displacement variable capacity type and it may be connected to a positive displacement non-variable hydraulic unit 22 within a closed circuit including lines 23 and 24. The unit 22 may be connected to a shaft 25 through speed reduction gears 23′ and 24′ for a purpose to be described later. A gear 26 may be fixed to shaft 25. The gear 26 may mesh with a gear 27 mounted on a second element 27′ of the epicyclic gearing arrangement D, and, gear 27 may mesh with a gear 28 on a second element 28′ of the epicyclic gearing arrangement C.

From the foregoing, it is evident that the hydraulic units 20 and 22 comprise a variable speed device that is connected to a second element of each of the epicyclic arrangements D and C. While a hydraulic steplessly variable speed device driven from the input shaft 10 has been disclosed, it is to be understood that the variable speed device need not be of the stepless variety, of the hydraulic type or be driven by the input shaft 10. It may comprise any form of variable speed device that can be adjusted in two directions throughout its range of speed variation. It may be driven by an external source of power, although when so driven, under certain circumstances a loss of "feed-back" power is experienced which latter can be utilized to advantage to a certain degree and under certain conditions of operation when the variable speed device is driven from the input shaft 10.

The second elements 27′ and 28′ of the arrangements D and C are shown as being rotated in opposite directions, but this is only exemplary and not to be considered as a limitation. The only reservation is that rotation of the first and second elements of each of the arrangements D and C should be such that as the variable speed device 20, 22 is operated to increase or decrease in speed, the speed of rotation of the third power transmitting element of one of the arrangements D or C increases while the speed of the third element of the other decreases.

In the embodiment disclosed in Fig. 1, the third element of the arrangement D may comprise a shaft 29 having an arm 30, to each of the outer ends of which a planet gear 31 is journaled. The planet gears 31, of course, mesh with the sun gear 14 as well as internal gear teeth 32 of the second element 27′ of the arrangement D.

The third element of the C arrangement may comprise a shaft 33 similar to shaft 29 and having an arm 34 journaling planet gears 35 that mesh with the sun gear 19 and the internal gear teeth 36 on the second element 28′.

Dissimilar ratio gearing may be provided between the shafts 29, 33 and an output shaft 37. This gearing may comprise spur gear 38 fixed to shaft 33 that meshes with a gear 39 journaled on shaft 37; and, a gear 40 fixed to shaft 29 in mesh with a gear 41 journaled on shaft 37. Separately operable clutch elements 42 and 43 may be splined to shaft 37 and they may, respectively, cooperate with clutch engaging means on gears 39 and 41 in a manner presently to be described.

Referring to Fig. 2, it is evident that shafts 10 and 18 can be made to rotate in opposite directions to each other by interposing an idler gear 16′ between idler gear 16 and gear 17. Furthermore, reactors 27′ and 28′ can be made to rotate in the same direction rather than in opposite directions by interposing an idler gear 28″ between gears 27 and 28. Such an arrangement causes shafts 29 and 33 to rotate in opposite directions, therefore, requiring an idler gear 40′ to be interposed between gears 40 and 41. With the transmission of Fig. 1 modified as shown in Fig. 2, the same end result is achieved, namely, as shaft 33 increases in speed, the shaft 29 decreases in speed and vice versa.

In order to best illustrate the intended method of operating the variable speed transmission, certain purely arbitrary values will be given to the various components. The following number of teeth of the various gears will be employed in the example to be described.

| Gear | Teeth | Gear | Teeth | Gear | Teeth |
| --- | --- | --- | --- | --- | --- |
| 11 | 10 | 19 | 20 | 35 | 20 |
| 12 | 10 | 26 | 20 | 36 | 60 |
| 14 | 20 | 27 | 80 | 38 | 25 |
| 15 | 30 | 28 | 80 | 39 | 50 |
| 16 | 30 | 31 | 20 | 40 | 25 |
| 17 | 30 | 32 | 60 | 41 | 25 |
| 23′ | 12 | 24′ | 27 | | |

With the above gear ratios, and with the input shaft 10 rotating at, say 1800 r.p.m. and since the gear ratio of each epicyclic arrangement is the same, the base speed of each arrangement is:

$$B.S. = \frac{s}{r+s}(\text{speed of sun})$$

where $r$ and $s$ are the gear teeth 32 and the teeth of the gear 14, respectively.

$$\therefore B.S. = \frac{20}{60+20}(1800)$$

$$= 450 \text{ r.p.m.(with element 27′ fixed)}$$

Assuming that it is desired to have the shaft 29 rotate 200 r.p.m. above and below the base speed of 450 r.p.m. Then, the speed of element 27′ in order to produce this ±150 r.p.m. of shaft 29 is:

$$As = \frac{r}{r+s} \text{ (speed of element 27′)}$$

$$150 = \frac{60}{60+20} \text{ (sp. of 27′)}$$

Sp. of 27′ = 150 × 4/3 = ± 200 r.p.m.

Accordingly, shaft 25 rotates at $$\pm 200 \times \frac{80}{20} = \pm 800 \text{ r.p.m.}$$

From the foregoing, it is evident that the hydraulic units 20 and 22 may be selected so that when the unit 20 is rotated at 1800 r.p.m. from the input shaft 10, with its lever 21 near, but not quite to its limits of adjustment (for a purpose to be described later) the unit 22 will rotate at 1800 r.p.m. and the latter will rotate shaft 25 at ±800 r.p.m. through the gear reduction 23′ and 24′.

The shaft 33 or 29 of the arrangement C or D in which the reactor element 27' or 28' thereof is rotating oppositely to its sun will rotate at 450—150=300 r.p.m.; and, the other shaft will rotate at 450+150=600 r.p.m., since its reactor is rotating in the same direction as its sun gear.

From the foregoing it is evident that the speeds of rotation of the reactor elements 27' and 28' do not vary relatively to each other, but elements 27' and 28' rotate in opposite directions; and, the sun gears 14 and 19, constituting the first elements of the arrangements C and D, rotate at the same speed in the same direction. Accordingly, when the units 20 and 22 are adjusted to increase the speed of the shaft 29, the speed of shaft 33 decreases, and when shaft 29 is at its maximum speed, shaft 33 is at its minimum speed and vice versa.

With the directions of rotation as indicated in the drawing, and with lever 21 in its solid line position near its one limiting position, shaft 33 rotates at 300 r.p.m. and shaft 29 rotates at 600 r.p.m. With clutch 42 engaged and clutch 43 disengaged, and keeping in mind the 1:2 ratio of gears 38 and 39, shaft 37 rotates at 150 r.p.m. As the lever 21 is moved to its number 2 position, both shafts 29 and 33 rotate at the base speed of 450 r.p.m., and shaft 37 rotates at 225 r.p.m.

Movement of lever 21 to its number 3 position near its other limiting position causes shaft 37 to rotate at 300 r.p.m., which is the speed of shaft 29 and gear 41 due to the 1:1 ratio of gears 40 and 41. Accordingly, clutch 43 may be engaged while clutch 42 remains in engagement due to the synchronous speeds of gears 39 and 41. After completion of the engagement of clutch 43 with gear 41, clutch 42 may be disengaged from gear 39.

It will be recalled that shaft 29 is rotating at 300 r.p.m., and its speed can be increased to 600 r.p.m. by moving lever 21 back to near its number 1 position.

In the embodiment disclosed, it is evident that clutch 42 should be connected to gear 39 and clutch 43 disengaged from gear 41 when the lever 21 initially is near its upper solid line position; and, when lever 21 is near its lower dotted line position clutch 43 should first be connected to gear 41 and then clutch 42 disengaged from gear 39, in order to prevent a condition arising when power is completely disconnected from the output shaft 37.

In order to ensure the clutch engaging means between gears 41, 39 and clutches 43, 42 properly enmeshing without tooth-on-tooth contact, and for ensuring clutch 43 becoming effective and unloading clutch 42 before the latter is disengaged and vice versa, a control for operating the transmission has been provided. It may include a clutch shifting lever 44 that is connected to a piston rod 45 that extends into a cylinder 46 in which a piston 47 is adapted to be reciprocated. The effective areas of each side of piston 47 may be equal.

Another clutch shifting lever 49 may be connected to clutch 43, and it may be connected to a piston rod 50 that extends into a cylinder 51 in which a piston 52 is adapted to be reciprocated. The effective areas of opposite faces of the piston 52 may also be equal.

The opposite ends of the cylinder 46 are connected through lines 55 and 56 to a valve chamber 57 in which a spool valve 58 is adapted to be reciprocated, and which is shown as being resiliently forced to the left hand end of chamber 57 by a spring 59.

The opposite ends of cylinder 51 are connected through lines 60 and 61 to a valve chamber 62 in which a spool valve 63 is adapted to be reciprocated, and which is shown as being resiliently forced to the left hand side of chamber 62 by a spring 64.

The spool valves 58 and 63 have rods 65 and 66, respectively, connected to them which are operated, respectively, by solenoids 67 and 68. A pressure fluid inlet 69 connects chambers 57 and 62. In the position of the spools 58 and 63 as shown in the drawings, pressure fluid passes from inlet 69 through lines 56 and 61 thereby effecting the engagement of clutch 42 to gear 39 and disengagement of clutch 43 from gear 41. The right hand ends of cylinders 46 and 51 are open to exhaust ports 70 and 71, respectively. Energizing solenoid 68 causes spool 63 to move rightwardly against spring 64, whereupon fluid pressure passes from inlet 69 through line 60 to the right hand end of cylinder 51. Since the left hand end of cylinder 51 is now open to an exhaust port 72, clutch 43 is moved into engagement with gear 41. Energizing solenoid 67 forces valve 58 rightwardly against spring 59, whereupon pressure fluid passes from inlet 69 through line 55 to the right hand end of cylinder 46. Since the left hand end of cylinder 46 will then be open to an exhaust port 73, clutch 42 is moved out of engagement with gear 39. The energization of solenoids 67 and 68 is adapted to be effected in a cycle of control operations that will be described later.

The operation of the lever 21 between its limits of motion may be effected by the oscillation of a lever 74 that is connected to an adjustable pivot 75. The lever 74 is provided with a slot 76 that cooperates with a driver 77 fixed to a saddle 78 that is adapted to be reciprocated along ways 79, 80. A cam follower 81 journaled on a pin fixed to the top of saddle 78 rides in a cam groove 82 on the periphery of a drum cam 83 that may be fixed to a rotatable shaft 84. The shaft 84 may be fixed to a worm gear 85 that is adapted to be rotated through slightly less than 360° in a forward and a reverse direction, and is limited in its rotation by a stop 86 and a fixed abutment 86'.

A cam shaft 87 may be driven from shaft 84 at a 1:2 ratio by bevel gears 88 and 89. Cams 90, 91, 92 and 93 may be fixed to shaft 87 and arranged relatively to switches 94, 95, 96, 97, 98 and 98' in the manner shown in the drawing.

With the apparatus in the condition shown in the drawing, and upon closing a switch 99', the motor 13 is energized causing the hydraulic unit 20 to deliver substantially maximum volume of liquid to hydraulic unit 22 to cause the latter to rotate shaft 25 at 800 r.p.m. The stops for limiting the maximum throw of lever 21 are set such that shaft 25 can be made to rotate slightly faster than ±800 r.p.m. for a reason presently to be described. With shaft 25 rotating at 800 r.p.m., shaft 33 is rotating at 300 r.p.m. and shaft 29 is rotating at 600 rp.m. Since clutch 42 is engaged and clutch 43 disengaged, shaft 37 is rotating at 150 r.p.m.

With the stop 86 on shaft 84 against the fixed abutment 86', switch 96 is closed and switch 97 is held open. With switch 97 held open, closing of reverse starting switch 100 will not energize the motor relay MR. Closing the switch 101 energizes the motor relay MF, thereby closing switches F, F in the circuit of a motor 102 that drives the worm gear 85 through a worm 103. Energizing motor relay MF also opens normally closed contacts MF-1 in the circuit for the motor relay MR. Energizing motor relay MF also closes normally open contacts MF-2, thereby energizing solenoid 99 to thereby locate the pivot 75 in the position shown, which provides a shorter arc of movement of lever 21 than is required for causing unit 20 to deliver its maximum capacity, hence rotating shaft 25 at a speed slightly less than 800 r.p.m. when lever 21 is at its number 3 position.

As the motor 102 begins to rotate in a forward direction, shaft 87 rotates in a counterclockwise direction. A land 104 on cam 90 immediately permits switch 97 to close, but this will not condition the circuit for motor relay MR since normally closed contacts MF-1 are now open.

As shaft 84 rotates, cam follower 81 rides in groove 82 of cam 83, thereby moving saddle 78 downwardly. This moves lever 21 toward its number 2 position causing shaft 37 to increase in speed from 150 r.p.m. to 225 r.p.m.

when lever 21 reaches its number 2 position, all as previously described.

Continued rotation of shaft 84 in the same direction causes cam 83 to move lever 21 to near its number 3 position and if it reached the number 3 position, unit 22 would have caused shaft 37 to increase in speed to 300 r.p.m., and gear 41 to decrease in speed from 600 to 300 r.p.m. However, as previously described, the arc of movement of lever 21 has been shortened by locating pivot 75 in the position shown. Accordingly, when cam 83 has moved lever 21 as far downwardly as possible in the embodiment disclosed, the speed of rotation of shaft 37 has not increased to 300 r.p.m., but to a slightly less speed such as, say 295 r.p.m. And, gear 41 has not decreased in speed to 300 r.p.m., but to a speed such as, say 305 r.p.m. Accordingly, there is a 10 r.p.m. differential in speed between gear 41 and clutch 43 that is splined to shaft 37.

At this point, a land 105 on cam 92, which has maintained switch 95 open from the start, permits switch 95 to close. Closing switch 95 energizes solenoid 68 which shifts spool 63 rightwardly against the action of spring 64, whereupon pressure liquid passes through line 60, forcing piston 52 leftwardly since line 61 is now connected to exhaust port 72.

Accordingly, clutch 43 is moved into engagement with gear 41, and since there is a 10 r.p.m. differential in speed between gear 41 and clutch 43, engagement will be assured since tooth-on-tooth "hang up" cannot occur. It will be remembered that gear 41 is rotating faster than clutch 43 and since clutch 42 is still engaged, the power passing through gear 39 and clutch 42 is transferred to gear 41 and clutch 43. Not only is this transfer effected but by virtue of the faster speed of gear 41 relatively to shaft 37, clutch 42 is relieved of load and if left in engagement, would "lock up" the transmission.

The above transfer of power occurs during the rotation of cam shaft 87 between 90° and a few degrees advance when a land 106 on cam 91 closes switch 94. Closing switch 94 energizes solenoid 67, thereby forcing spool valve 58 rightwardly against the action of spring 59. This causes pressure liquid to flow through line 55 forcing piston 47 leftwardly since line 56 is now open to the exhaust port 73. Accordingly, clutch 42 is disengaged from gear 39. The end of land 105 on cam 92 and the beginning of land 106 on cam 91 is spaced apart an amount to permit the transfer of power to clutch 43 and the unloading of clutch 42. This spacing can be determined by experiment. It is evident that should the switch 101 be released during this period when both clutches 42 and 43 are engaged with gears 39 and 41, the transmission would "lock up." To prevent this, a land 107 on cam 93 closes the contact 98 which is ineffective when closed, except if switch 101 is released during the period when clutches 42 and 43 are effective. In such a case, motor relay MF remains energized to ensure the land 106 becoming effective to close switch 94 to thereby effect the disengagement of clutch 42. From the foregoing, it is evident that the length of land 107 on cam 93 equals the angular spacing of the end of land 105 on cam 92 and the beginning of the land 106 on cam 91.

At this point, the cam 83 has rotated 180° from where it started, and saddle 78 is at its lowest position. Continuing the holding of switch 101 closed causes the continued rotation of cam 83 in the same direction to thereby move lever 21 from its number 3 position where shaft 37 is rotating at 300 r.p.m., or better, say 305 r.p.m. due to the previously described transferring of power and unloading of clutch 42. As lever 21 moves upwardly to its number 2 position, the speed of shaft 37 increases to 450 r.p.m. Continued upward movement of lever 21 increases the speed of shaft 37 to substantially 600 r.p.m. where land 104 on cam 90 opens switch 96, thereby de-energizing motor relay MF and stopping the rotation of cam shaft 87, with the shaft 37 rotating at its maximum speed of substantially 600 r.p.m.

To reduce the speed of shaft 37, switch 100 is closed, and since switch 97 is now closed, motor relay MR is energized. Energizing relay MR opens normally closed contacts MR–1 and closes normally open contacts MR–2. Opening contacts MR–1 prevents energizing the motor relay MF should switch 101 be closed. Closing MR–2 contacts energizes solenoid 100′, whereupon the pivot point 75 moves to its righthand position 75′ which increases the throw of lever 21 during the ensuing portion of the cycle of operations for a purpose presently to appear.

Energizing the MR relay also closes normally open contacts RR of the motor 102, causing it to rotate in a direction to effect clockwise rotation of cam shaft 87. As cam shaft 87 begins to rotate in a clockwise direction, switch 96 closes, but relay MF cannot be energized by closing switch 101 since switch MR–1 is now open.

Continued rotation of cam 83 in the reverse direction moves saddle 78 downwardly again, whereupon lever 21 moves downwardly to its number 2 position and shaft 37 decreases in speed to 450 r.p.m. When lever 21 approaches its number 3 position again, the speed of shaft 29 decreases toward 300 r.p.m. and the speed of shaft 33 increases toward 600 r.p.m. Due to the gear ratio of 2:1 between gears 39 and 38, the speed of gear 39, therefore, increases toward 300 r.p.m. However, since the extent of the arc of movement of lever 21 has been increased due to the shifting of pivot 75 rightwardly, shaft 29 and gear 41 decrease in speed beyond 300 to, say 295 r.p.m. Correspondingly, gear 39 increases in speed beyond 300 r.p.m. to, say, 305 r.p.m. Consequently, there is a differential of, say, 10 r.p.m. between clutch 42 and gear 39 so that engagement between them can be effected without the danger of tooth-on-tooth contact.

At this point in the cycle, the land 106 on cam 91 permits opening of switch 94, thereby de-energizing solenoid 67. This permits spring 59 to return valve 58 to the position shown in the drawings where pressure liquid is caused to flow through line 56 to force piston 47 rightwardly since line 55 is now open to the exhaust port 70. Accordingly, clutch 42 is engaged to gear 39 while clutch 43 remains engaged to gear 41. Since, as previously explained, gear 39 is trying to drive clutch 42 at, say, 305 r.p.m. and gear 41 is trying to drive clutch 41 at, say, 295 r.p.m., it is evident that the power previously flowing through gear 41 and clutch 43 is transferred to gear 39 and clutch 42. Additionally, gear 41 and clutch 43 are unloaded during this period of simultaneous effectiveness of both clutches 42 and 43.

Also, during this interval land 107 on cam 93 has closed contacts 98′ to maintain relay MR energized should switch 100 be released.

At the end of this short interval, land 105 on cam 92 opens switch 95, thereby de-energizing solenoid 68. This permits spring 64 to return valve 63 to the position shown in the drawings where pressure liquid flows through line 61, forcing piston 52 rightwardly since line 60 is now open to exhaust port 71. Accordingly, clutch 43 is disengaged from gear 41.

Continued reverse rotation of cam 83 returns lever 21 to its number 1 position where shaft 37 is rotating at 150 r.p.m. At this point, land 104 on cam 90 has opened switch 97, thereby de-energizing relay MR and stopping motor 102.

From the foregoing it is evident that switch 101 can be depressed to cause shaft 37 to steplessly increase in speed to any speed between 150 and 600 r.p.m., and upon release of switch 101, shaft 37 continues to rotate at the selected speed. From this selected speed, shaft 37 can be increased in speed or decreased in speed to any desired speed by simply holding switch 101 or 100 closed until the desired speed is reached.

The transmission disclosed was purposely selected to illustrate the principles of the invention with the greatest of simplicity, and although a steplessly variable speed transmission having a range of output speeds from 150 r.p.m. to 600 r.p.m. at constant horsepower substantially throughout its range may be limited somewhat in its application to industrial installations, it is evident that transmissions covering far wider ranges of output speeds from zero to speeds in excess of that of the input shaft and reverse can be designed which embody the principles of the invention to give a constant horsepower range of any desired ratio.

Although the various features of the new and improved transmission have been shown and described in detail to fully disclose one embodiment of the invention, it will be evident that numerous changes may be made in such details, and certain features may be used without others without departing from the principles of the invention.

What is claimed is:

1. In a variable speed transmission, an input shaft; an output shaft; two epicyclic gearing arrangements between said input and output shafts for transmitting power independently of each other from said input to said output shaft, each arrangement comprising three power transmitting elements; means for driving one of the elements of each of said arrangements from said input shaft; a variable speed device; means for increasing and decreasing the speed of said variable speed device; means connecting a second element of each of said arrangements to said variable speed device, the construction and arrangement of the parts being such that as the variable speed device increases in speed, one of said third elements increases in speed and the other of said third elements simultaneously decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicyclic gearing arrangement; and means for transferring the flow of power to said output shaft from one of said epicyclic gearing arrangements to said other epicyclic gearing arrangement when said third elements, respectively, are rotating at a speed above and below the base speed of their corresponding epicyclic gearing arrangements.

2. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; a steplessly variable speed device; means for increasing and decreasing the speed of said variable speed device; means connecting a second element of each of said arrangements to said variable speed device, the construction and arrangement of the parts being such that as the variable speed device increases in speed, one of said third elements increases in speed and the other of said third elements simultaneously decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicyclic gearing arrangement; and means for transferring the flow of power to said output shaft from one of said epicyclic gearing arrangements to said other epicyclic gearing arrangement when said third elements, respectively, are rotating at a speed above and below the base speed of their corresponding epicyclic gearing arrangements.

3. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; an hydraulic steplessly variable speed device; means for increasing and decreasing the speed of said variable speed device; means connecting a second element of each of said arrangements to said variable speed device, the construction and arrangement of the parts being such that as the variable speed device increases in speed, one of said third elements increases in speed and the other of said third elements simultaneously decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicyclic gearing arrangement; and means for transferring the flow of power to said output shaft from one of said epicyclic gearing arrangements to said other epicyclic gearing arrangement when said third elements, respectively, are rotating at a speed above and below the base speed of their corresponding epicyclic gearing arrangements.

4. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; an hydraulic steplessly variable speed unit; means for driving said hydraulic unit; a constant displacement hydraulic unit driven by said steplessly variable unit; means for adjusting said steplessly variable unit; means for connecting a second element of each of said arrangements to said constant displacement hydraulic unit, the construction and arrangement of the parts being such that as said steplessly variable unit increases in speed, one of said third elements increases in speed and the other of said third elements simultaneously decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicyclic gearing arrangement; and means for transferring the flow of power to said output shaft from one of said epicyclic gearing arrangements to said other epicyclic gearing arrangement when said third elements, respectively, are rotating at a speed above and below the base speed of their corresponding epicyclic gearing arrangements.

5. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; an hydraulic steplessly variable speed unit, connected to said input shaft; a constant displacement hydraulic unit driven by said steplessly variable unit; means for adjusting said steplessly variable unit; means for connecting a second element of each of said arrangements to said constant displacement hydraulic unit, the construction and arrangement of the parts being such that as said steplessly variable unit increases in speed, one of said third elements increases in speed and the other of said third elements decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicycle gearing arrangement; and means for transferring the flow of power to said output shaft from one of said epicyclic gearing arrangements to said other epicyclic gearing arrangement when said third elements, respectively, are rotating at a speed above and below the base speed of their corresponding epicyclic gearing arrangements.

6. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; a variable speed device; means for increasing and decreasing the speed of said variable speed device; means connecting a second element of each of said arrangements to said variable speed device, the construction and arrangement of the parts being such that as the variable speed device increases in speed, one of said third elements increases in speed and the other of said third elements decreases in speed; dissimilar ratio means between said epicyclic gearing arrangements and said output shaft; means for connecting one of said ratio means to said output shaft; means for causing said other ratio means to rotate at a speed slightly faster than the speed of said output shaft when said variable speed device is at one limit of its speed adjustment; means for connecting said other ratio means to said output shaft while said one ratio means is still connected thereto for transferring the power flowing through said one ratio means to the other and for unloading said one ratio means; and means for disconnecting said one ratio means from said output shaft after it has become unloaded.

7. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in the same direction relatively to each other; a variable speed device; means for connecting a second element of each of said arrangements to said variable speed device for rotation in opposite directions relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

8. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in the same direction relatively to each other; a steplessly variable speed device; means for connecting a second element of each of said arrangements to said variable speed device for rotation in opposite directions relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

9. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in the same direction relatively to each other; an hydraulic steplessly variable speed device; means for connecting a second element of each of said arrangements to said variable speed device for rotation in opposite directions relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

10. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in the same direction relatively to each other; an hydraulic steplessly variable speed unit; means for driving said hydraulic unit; a constant displacement hydraulic unit driven by said steplessly variable unit; means for adjusting said steplessly variable unit; means for connecting a second element of each of said arrangements to said constant displacement hydraulic unit for rotation in opposite directions relatively to each other; dissimilar ratio means between each arrangement and said output shaft, said ratio means including gears journaled on said output shaft adapted to be rotated at the same speed when said hydraulic steplessly variable unit is at one of its limits of speed adjustment; means for rendering effective one of said ratio means under a no-load condition while said other ratio means is effective and under load; and means for unloading said other ratio means prior to rendering it ineffective.

11. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in the same direction relatively to each other; an hydraulic steplessly variable speed unit connected to said input shaft; a constant displacement hydraulic unit driven by said steplessly variable unit; means for adjusting said steplessly variable unit; means for connecting a second element of each of said arrangements to said constant displacement hydraulic unit for rotation in opposite directions relatively to each other; dissimilar ratio means between each arrangement and said output shaft, said ratio means including gears journaled on said output shaft adapted to be rotated at the same speed when said hydraulic steplessly variable unit is at one of its limits of speed adjustment; means for rendering effective one of said ratio means under a no-load condition while said other ratio means is effective and under load; and means for unloading said other ratio means prior to rendering it ineffective.

12. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in the same direction relatively to each other; a variable speed device; means for connecting a second element of each of said arrangements to said variable speed device for rotation in opposite directions relatively to each other; dissimilar ratio means between each arrangement and said output shaft; means for connecting one of said ratio means to said output shaft; means for causing said other ratio means to rotate at a speed slightly faster than the speed of said output shaft when said variable speed device is at one limit of its speed adjustment; means for connecting said other ratio means to said output shaft while said one ratio means is still connected thereto for transferring the power flowing through said one ratio means to the other and for unloading said one ratio means; and means for disconnecting said one ratio means from said output shaft after it has become unloaded.

13. In a variable speed transmission, an input shaft; an output shaft; two paths of power flow between said input and output shafts; an epicyclic gearing arrangement in each of said paths; means for transmitting power through said arrangements independently of each other from said input to said output shafts throughout separate ranges of speed of said output shaft, each arrangement comprising three power transmitting elements; means for connecting a first element of each arrangement to said input shaft for rotation in the same direction relatively to each other; a variable speed device; means for driving said variable speed device; means for adjusting said variable speed device; means for connecting a second element of each of said arrangements to said variable speed device for rotation in opposite directions relatively to each other; ratio means between each of said arrangements and said output shaft and adapted to rotate said output shaft through their corresponding epicyclic gearing arrangements at the same speed when said variable speed device is at one point in its speed adjustment; and means for transferring the flow of power to said output shaft from one of said epicyclic arrangements to the other when said variable speed device is at said one point in its speed adjustment.

14. In a variable speed transmission, an input shaft; an output shaft; two paths of power flow between said input and output shafts; an epicyclic gearing arrangement in each of said paths; means for transmitting power through said arrangements independently of each other from said input to said output shafts throughout separate ranges of speed of said output shaft, each arrangement comprising three power transmitting elements; means for connecting a first element of each arrangement to said input shaft for rotation in the same direction relatively to each other; a steplessly variable speed device; means for driving said steplessly variable speed device; means for adjusting said steplessly variable speed device; means for connecting a second element of each of said arrangements to said steplessly variable speed device for rotation in opposite directions relatively to each other; ratio means between each of said arrangements and said output shaft and adapted to rotate said output shaft through their corresponding epicyclic gearing arrangements at the same speed when said steplessly variable speed device is at one point in its speed adjustment; and means for transferring the flow of power to said output shaft from one of said epicyclic arrangements to the other when said steplessly variable speed device is at said one point in its speed adjustment.

15. In a variable speed transmission, an input shaft; an output shaft; two paths of power flow between said input and output shafts; an epicyclic gearing arrangement in each of said paths; means for transmitting power through said arrangements independently of each other from said input to said output shafts, throughout separate ranges of speed of said output shaft, each arrangement comprising three power transmitting elements; means for connecting a first element of each arrangement to said input shaft for rotation in the same direction relatively to each other; an hydraulic steplessly variable speed device; means for driving said hydraulic steplessly variable speed device; means for adjusting said hydraulic steplessly variable speed device; means for connecting a second element of each of said arrangements to said hydraulic steplessly variable speed device for rotation in opposite directions relatively to each other; ratio means between each of said arrangements and said output shaft and adapted to rotate said output shaft through their corresponding epicyclic gearing arrangements at the same speed when said hydraulic steplessly variable speed device is at one point in its speed adjustment; and means for transferring the flow of power to said output shaft from one of said epicyclic arrangements to the other when said hydraulic steplessly variable speed device is at said one point in its speed adjustment.

16. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in the same direction relatively to each other; an hydraulic steplessly variable speed unit; means for driving said hydraulic steplessly variable speed unit; a constant displacement hydraulic unit driven by said steplessly variable unit; means for adjusting said steplessly variable unit; means for connecting a second element of each of said arrangements to said constant displacement hydraulic unit for rotation in opposite directions relatively to each other; ratio means between each of said arrangements and said output shaft and adapted to rotate said output shaft through their corresponding epicyclic gearing arrangements at the same speed when said hydraulic steplessly variable speed unit is at one point in its speed adjustment; and means for transferring the flow of power to said output shaft from one of said epicyclic arrangements to the other when said hydraulic steplessly variable speed unit is at said one point in its speed adjustment.

17. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in the same direction relatively to each other; an hydraulic steplessly variable speed unit connected to said input shaft; a constant displacement hydraulic unit driven by said steplessly variable unit; means for adjusting said steplessly variable unit; means for connecting a second element of each of said arrangements to said constant displacement hydraulic unit for rotation in opposite directions relatively to each other; ratio means between each of said arrangements and said output shaft and adapted to rotate said output shaft through their corresponding epicyclic gearing arrangements at the same speed when said hydraulic steplessly variable speed unit is at one point in its speed adjustment; and means for transferring the flow of power to said output shaft from one of said epicyclic arrangements to the other when said hydraulic steplessly variable speed unit is at said one point in its speed adjustment.

18. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting an element of each arrangement to said input shaft; a variable speed device; means connecting a second element of each arrangement to said variable speed device, the direction of rotation of the elements connected to the input shaft and the variable speed device of each arrangement being such that the speed of a third element of one arrangement increases while that of a third element of the other arrangement decreases when the speed of the variable speed device is varied; dissimilar ratio means between said epicyclic gearing arrangements and said output shaft, said dissimilar ratio means being such that when the third elements of said arrangements are at a speed above and below base speed of their respective arrangements with said variable speed device at one of its limits of speed adjustment, either ratio means may be rendered effective; and means for operating said variable speed device to cause said output shaft to vary in speed between a minimum and a maximum.

19. In a variable speed transmission, an input shaft; an output shaft; two epicyclic gearing arrangements between said input and output shafts for transmitting power independently of each other from said input to said output shafts, each arrangement comprising three power transmitting elements; means for driving one of the elements of each of said arrangements from said input shaft; a variable speed device; means for increasing and decreasing the speed of said variable speed device; means connecting a second element of each of said arrangements to said variable speed device, the construction and arrangement of the parts being such that as the variable speed device increases in speed, one of said third elements increases in speed and the other of said third elements decreases in speed; dissimilar ratio means between said epicyclic gearing arrangements and said output shaft adapted to cause the output shaft to rotate at the same speed when one of the third elements is connected to the output shaft and is rotating at a speed above the base speed of its corresponding epicyclic gearing arrangement and the other of said third elements is connected to the output shaft and is rotating at a speed below the base speed of its corresponding epicyclic gearing arrangement; means for transferring the power flowing to said output shaft from one of said arrangements to the other when said above and below base speed condition of said third elements occurs, said transferring means including clutches between said third elements and said output shaft; means for engaging one of said clutches under no-load condition while maintaining a loaded condition on the other; and means for loading said one clutch thereby unloading said other clutch prior to disengaging said other clutch.

20. In a variable speed transmission, an input shaft; an output shaft; plural paths of power flow between said input and output shafts; an epicyclic gearing arrangement in each path of power flow; an auxiliary variable speed device connected to said epicyclic gearing arrangements for causing an element of each arrangement, simultaneously, to increase and decrease in speed relatively to the base speed of its corresponding arrangement when the speed of said auxiliary variable speed device is changed; and means for selectively connecting said elements to said output shaft when said elements, respectively, are above and below the base speed of their corresponding arrangements.

21. In a variable speed transmission, an input shaft; an output shaft; plural paths of power flow between said input and output shafts; an epicyclic gearing arrangement in each path of power flow; an auxiliary stepless variable speed device connected to said epicyclic gearing arrangements for causing an element of each arrangement, simultaneously, to increase and decrease in speed relatively to the base speed of its corresponding arrangement when the speed of said auxiliary stepless variable speed device is changed; and means for selectively connecting said elements to said output shaft when said elements, respectively, are above and below the base speed of their corresponding arrangements.

22. In a variable speed transmission, an input shaft; an output shaft; plural paths of power flow between said input and output shafts; an epicyclic gearing arrangement in each path of power flow; an auxiliary hydraulic stepless variable speed device connected to said epicyclic gearing arrangements for causing an element of each arrangement, simultaneously, to increase and decrease in speed relatively to the base speed of its corresponding arrangement when the speed of said auxiliary hydraulic stepless variable speed device is changed; and means for selectively connecting said elements to said output shaft, when said elements, respectively, are above and below the base speed of their corresponding arrangements.

23. In a variable speed transmission, an input shaft; an output shaft; plural paths of power flow between said input and output shafts; an epicyclic gearing arrangement in each path of power flow; an auxiliary variable speed device having a variable capacity positive displacement hydraulic unit and a constant displacement hydraulic unit within a closed hydraulic circuit and connected to said epicyclic gearing arrangements for causing an element of each arrangement, simultaneously, to increase and decrease in speed relatively to the base speed of its corresponding arrangement when the speed of said auxiliary variable speed device is changed; and means for selectively connecting said elements to said output shaft when said elements, respectively, are above and below the base speed of their corresponding arrangements.

24. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in opposite directions relatively to each other; a variable speed device; means for connecting a second element of each of said arrangements to said variable speed device for rotation in the same direction relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

25. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in opposite directions relatively to each other; a steplessly variable speed device; means for connecting a second element of each of said arrangements to said variable speed device for rotation in the same direction relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

26. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in opposite directions relatively to each other; an hydraulic steplessly variable speed device; means for connecting a second element of each of said arrangements to said variable speed device for rotation in the same direction relatively to each other; dissimilar ratio means between each arrangement and said output shaft, said ratio means including gears journaled on said output shaft adapted to be rotated at the same speed when said variable speed device is at one of its limits of speed adjustment; means for rendering effective one of said ratio means under a no-load condition while said other ratio means is effective and under load; and means for unloading said other ratio means prior to rendering it ineffective.

27. In a variable speed transmission, an input shaft; an output shaft; two paths of power flow between said input and output shafts; an epicyclic gearing arrangement in each of said paths for transmitting power from said input to said output shafts, each arrangement comprising three power transmitting elements; means for connecting a first element of each arrangement to said input shaft for rotation in opposite directions relatively to each other; an hydraulic steplessly variable speed unit; means for driving said hydraulic unit; a constant displacement hydraulic unit driven by said steplessly variable unit; means for adjusting said steplessly variable unit; means for connecting a second element of each of said arrangements to said constant displacement hydraulic unit for rotation in the same direction relatively to each other; dissimilar ratio means between each arrangement and said output shaft, said ratio means including gears journaled on said output shaft adapted to be rotated at the same speed when said hydraulic steplessly variable unit is at one of its limits of speed adjustment; means for rendering effective one of said ratio means under a no-load condition while said other ratio means is effective and under load; and means for unloading said other ratio means prior to rendering it ineffective.

28. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in opposite directions relatively to each other; an hydraulic steplessly variable speed unit connected to said input shaft; a constant displacement hydraulic unit driven by said steplessly variable unit; means for adjusting said steplessly variable unit; means for connecting a second element of each of said arrangements to said constant displacement hydraulic unit for rotation in the same direction relatively to each other; dissimilar ratio means between each arrangement and said output shaft, said ratio means including gears journaled on said output shaft adapted to be rotated at the same speed when said hydraulic steplessly variable unit is at one of its limits of speed adjustment; means for rendering effective one of said ratio means under a no-load condition while said other ratio means is effective and under load; and means for unloading said other ratio means prior to rendering it ineffective.

29. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in opposite directions relatively to each other; a variable speed device; means for connecting a second element of each of said arrangements to said variable speed device for rotation in the same direction relatively to each other; dissimilar ratio means between each arrangement and said output shaft; means for connecting one of said ratio means to said output shaft; means for causing said other ratio means to rotate at a speed slightly faster than the speed of said output shaft when said variable speed device is at one limit of its speed adjustment; means for connecting said other ratio means to said output shaft while said one ratio means is still connected thereto for transferring the power flowing through said one ratio means to the other and for unloading said one ratio means; and means for disconnecting said one ratio means from said output shaft after it has become unloaded.

30. In a variable speed transmission, an input shaft; an output shaft; two paths of power flow between said input and output shafts; an epicyclic arrangement in each of said paths; means for transmitting power through each of said arrangements independently of each other from said input to said output shafts throughout separate ranges of speed of said output shaft, each arrangement comprising three power transmitting elements; means for connecting a first element of each arrangement to said input shaft for rotation in opposite directions relatively to each other; a variable speed device; means for driving said variable speed device; means for adjusting said variable speed device; means for connecting a second element of each of said arrangements to said variable speed device for rotation in the same direction relatively to each other; ratio means between each of said arrangements and said output shaft and adapted to rotate said output shaft through their corresponding epicyclic arrangements at the same speed when said variable speed device is at one point in its speed adjustment; and means for transferring the flow of power to said output shaft from one of said epicyclic arrangements to the other when said variable speed device is at said one point in its speed adjustment.

31. In a variable speed transmission, an input shaft; an output shaft; two paths of power flow between said input and output shafts; an epicyclic arrangement in each of said paths; means for transmitting power through each of said arrangements independently of each other from said input to said output shafts throughout separate ranges of speed of said output shaft, each arrangement comprising three power transmitting elements; means for connecting a first element of each arrangement to said input shaft for rotation in opposite directions relatively to each other; a steplessly variable speed device; means for driving said steplessly variable speed device; means for adjusting said steplessly variable speed device; means for connecting a second element of each of said arrangements to said steplessly variable speed device for rotation in the same direction relatively to each other; ratio means between each of said arrangements and said output shaft and adapted to rotate said output shaft through their corresponding epicyclic arrangements at the same speed when said steplessly variable speed device is at one point in its speed adjustment; and means for transferring the flow of power to said output shaft from one of said epicyclic arrangements to the other when said stepiessly variable speed device is at said one point in its speed adjustment.

32. In a variable speed transmission, an input shaft; an output shaft; two paths of power flow between said input and output shafts; an epicyclic arrangement in each of said paths; means for transmitting power through each of said arrangements independently of each other from said input to said output shafts throughout separate ranges of speed of said output shaft, each arrangement comprising three power transmitting elements; means for connecting a first element of each arrangement to said input shaft for rotation in opposite directions relatively to each other; an hydraulic steplessly variable speed device; means for driving said hydraulic steplessly variable speed device; means for adjusting said hydraulic steplessly variable speed device; means for connecting a second element of each of said arrangements to said hydraulic steplessly variable speed device for rotation in the same direction relatively to each other; ratio means between each of said arrangements and said output shaft and adapted to rotate said output shaft through their corresponding epicyclic arrangements at the same speed when said hydraulic steplessly variable speed device is at one point in its speed adjustment; and means for transferring the flow of power to said output shaft from one of said epicyclic arrangements to the other when said hydraulic steplessly variable speed device is at said one point in its speed adjustment.

33. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in opposite directions relatively to each other; an hydraulic steplessly variable speed unit; means for driving said hydraulic unit; a constant displacement hydraulic unit driven by said steplessly variable unit; means for adjusting said steplessly variable unit; means for connecting a second element of each of said arrangements to said constant displacement hydraulic unit for rotation in the same direction relatively to each other; ratio means between each of said arrangements and said output shaft and adapted to rotate said output shaft through their corresponding epicyclic gearing arrangements at the same speed when said hydraulic steplessly variable speed unit is at one point in its speed adjustment; and means for transferring the flow of power to said output shaft from one of said epicyclic arrangements to the other when said hydraulic steplessly variable speed unit is at said one point in its speed adjustment.

34. In a variable speed transmission, an input shaft; an output shaft; two paths of power flow between said input and output shafts; an epicyclic gearing arrangement in each of said paths for transmitting power independently of each other from said input to said output shafts, each arrangement comprising three power transmitting elements; means for connecting a first element of each arrangement to said input shaft for rotation in opposite directions relatively to each other; an hydraulic steplessly variable speed unit connected to said input shaft; a constant displacement hydraulic unit driven by said steplessly variable unit; means for adjusting said steplessly variable unit; means for connecting a second element of each of said arrangements to said constant displacement hydraulic unit for rotation in the same direction relatively to each other; ratio means between each of said arrangements and said output shaft and adapted to rotate sid output shaft through their corresponding epicyclic gearing arrangements at the same speed when said hydraulic steplessly variable speed unit is at one point in its speed adjustment; and means for transferring the flow of power to said output shaft from one of said epicyclic arrangements to the other when said hydraulic steplessly variable speed unit is at said one point in its speed adjustment.

References Cited in the file of this patent

UNITED STATES PATENTS

| | | |
|---|---|---|
| 2,464,275 | Trofimov | Mar. 15, 1949 |
| 2,808,737 | Bullard | Oct. 8, 1957 |